(12) United States Patent
Belyakov et al.

(10) Patent No.: US 6,594,138 B1
(45) Date of Patent: Jul. 15, 2003

(54) ELECTROCHEMICAL CAPACITOR AND METHOD FOR MAKING THE SAME

(76) Inventors: Alexei I. Belyakov, Prospect Leninskogo Komsomola, dom 54, kv 54, Kursk (RU), 305026; Alexander M. Bryntsev, Ulitsa Chulkova Gora, dom 23, Kursk (RU), 305041; Michail S. Zvyagintsev, Prospect Entoziastov, dom 2a, kv. 131, Kursk (RU), 305040; Viktor G. Alekhin, Ulitsa Pavlunoskogo, dom. 1 kv. 129, Kursk (RU), 305016; Nelya V. Khodyrevskaya, Ulitsa Mendeleyeva, dom. 18, kv. 3, Kursk (RU), 305026

( * ) Notice: Subject to any disclaimer, the term of this patent is extended or adjusted under 35 U.S.C. 154(b) by 0 days.

(21) Appl. No.: 09/831,384
(22) PCT Filed: Nov. 27, 1998
(86) PCT No.: PCT/RU98/00399
§ 371 (c)(1),
(2), (4) Date: Aug. 6, 2001
(87) PCT Pub. No.: WO00/33333
PCT Pub. Date: Jun. 8, 2000

(30) Foreign Application Priority Data

Nov. 11, 1998 (RU) ............................................. 98120015

(51) Int. Cl.$^7$ .............................. H01G 9/00; H01G 9/04
(52) U.S. Cl. ........................................ 361/502; 361/503
(58) Field of Search .................................. 361/502–522

(56) References Cited

U.S. PATENT DOCUMENTS

| 4,394,713 | A | * | 7/1983 | Yoshida ...................... 29/25.41 |
| 5,161,094 | A |   | 11/1992 | Bruder et al. |
| 5,172,307 | A | * | 12/1992 | Tabuchi et al. ............. 29/25.03 |
| 5,450,279 | A | * | 9/1995 | Yoshida et al. .............. 361/502 |

FOREIGN PATENT DOCUMENTS

| EP | 0200327 A2 | 12/1986 |
| RU | 2094880 C1 | 10/1997 |
| WO | WO92/12521 A1 | 6/1992 |

* cited by examiner

Primary Examiner—Anthony Dinkins
Assistant Examiner—Eric Thomas
(74) Attorney, Agent, or Firm—McDermott, Will & Emery

(57) ABSTRACT

A high-strength capacitor (1) for high-voltage charges includes a body having a set of elements (2) arranged therein as well as a plurality of current out puts (3) connected to said elements. The set of elements includes serially connected peripheral (4) and inner (5) elements which include porous electrodes (6,7) with a volumetric collector, isolation separators (8,9) as well as an electron conducting collector (10). In order to equalize the voltage in a set of serially connected elements, the body includes electron conductors connected together by clamps and arranged in openings (13) formed in each separator. The sets further include a cover (14) separated from the body by an additional layer (15). The body is self-supporting. The porous electrodes are elastic.

26 Claims, 2 Drawing Sheets

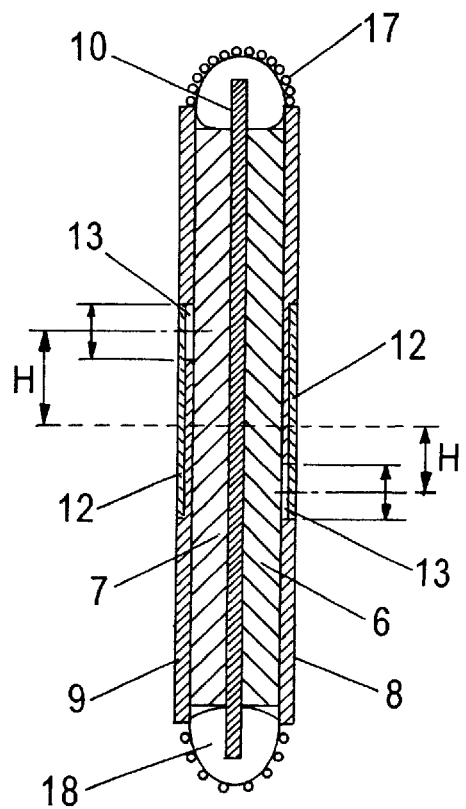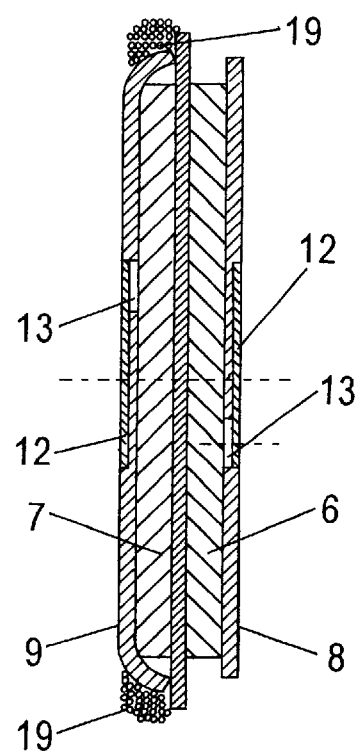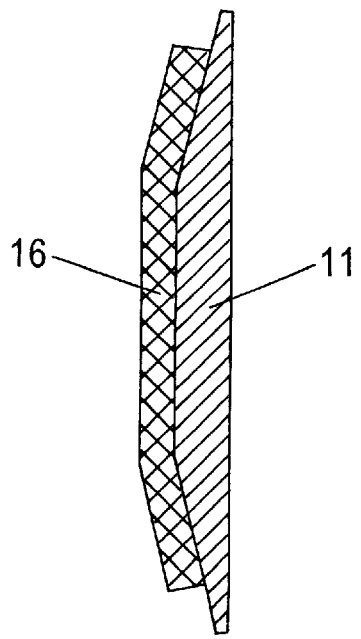

ELECTROCHEMICAL CAPACITOR AND METHOD FOR MAKING THE SAME

This application claims priority of Russian Patent Application No. 98120015 filed Nov. 11, 1998.

FIELD OF THE ART

The present invention relates to high-capacity electric capacitors for storing electric energy and to methods of their manufacture, and more particularly to an electrochemical capacitor and to a method of manufacturing thereof.

STATE OF THE ART

Known in the art is a design of a capacitor with a double electric layer (U.S. Pat. No. 3,356,963), comprising a bank of storage sections arranged one on the other, connected in series and provided with insulators and current leadouts, each section having two porous electrodes impregnated with an aqueous electrolyte, said electrodes containing activated carbon particles and being separated by an electron-insulating porous separator. Each storage section has electron-conducting current-leading plates impervious for and inert to the electrolyte, encompassing the electrodes and connected with the separator over the periphery of the section with the help of a sealing layer.

The electrodes are made paste-like from a mixture of activated carbon particles and the electrolyte, the electron-insulating ion-conducting separator contacting the electrodes. The electrodes have a consistency of a viscous paste and consist of activated carbon particles having a surface area of 1000 to 2000 $m^2/g$, mixed with the electrolyte. As the activated carbon use is made of materials prepared from charcoal, coal and coke. As the electrolyte use is made of aqueous solutions of acids, salts or bases, as well as of nonaqueous electrolytes. The separator is made from a highly porous material in the form of an ion-exchange membrane, and is impregnated with the electrolyte. Each storage section has two electron-conducting electron-impervious plates inert to the electrolyte, encompassing the electrodes. Each plate contacts the surface of the corresponding electrode, it functions as a current collector, and separates neighboring storage sections with respect to the electrolyte. As the plate material use is made of carbon, lead, iron, nickel, titanium or other material inert to the chosen electrolyte. The plates are connected with the separator over the periphery of the storage section with the help of a sealing layer made as a flexible gasket whose main function is to retain the paste-like electrolyte and preclude its spreading beyond the section when mounting in a compressed state in the capacitor body. Storage sections are arranged in the bank one atop the other and connected in series. Electric contact between the sections is ensured over the surface of contacting plates. The bank is installed in the capacitor body made as a chamber from polymethyl methacrylate, provided with current leadouts in the form of wires passing through openings in an insulation disk.

The structure nearest in its technical essence to the one proposed in the present invention is a structure of an electric capacitor comprising a body, at least one bank of elements arranged therein and current leadouts connected with said bank, the bank of elements consisting of series-connected end and internal elements containing porous electrodes with activated carbon particles and a bulk collector, electron-insulating separators and an electron-conducting collector, the separators and the electrodes being impregnated with an electrolyte (WO, A1 92/12521), each electrode is made solid, additionally comprises a disperse electrode and a binder, and has an ion-conducting support integrally connected therewith, the separator is provided with an integral bearing frame from a hard dielectric material, extending beyond the periphery of the electrodes and the plates made from a plastic metallic sheet, whose edges are profiled and hermetically connected with the bearing framer of the separator, and a bank of storage sections is arranged between flat current-leading plates connected with switching current taps of the storage sections and the leadouts of the body which is made as a tight enclosure from an elastic metallic sheet, tightly connected with power plates, the surfaces of the switching current taps, the profiled edges of the capacitor plates, and the bearing frames of the separators of each storage section, as well as the internal surface of the body enclosure which faces them and is at a prescribed distance therefrom, making up a cavity, whose internal volume is filled with a dielectric having a high adhesion to at least the materials of the capacitor plates, bearing frame, and insulators of the capacitor body, said dielectric together with the bank of sections and the body enclosure making up a single unit.

Though the above-described designs on the whole provide for the realization of a new method of storing electric energy in electrochemical capacitors in their double electric layer on the developed surface of the electrodes, they suffer from a number of technical and economic limitations:

paste-like electrodes connected with the separator by means of a flexible gasket, comprised in the banks of elements arranged in a rigid body may peel off the capacitor plate in the course of their service, which leads to an increase of contact resistance between the electrode and, in its turn, increases the internal resistance of the elements and the capacitor comprising the bank of elements;

during long-term service the electric contact between the activated carbon particles in the paste-like electrode inevitably deteriorates, and this also leads to an increase of the internal resistance of the capacitor and to a decrease of its electric capacity;

the use of the paste-like electrode involves serious difficulties in making a section having a large area, so that the field of application of this design is limited to small-size capacitors having a low power capacity (less than 10–100 J); the solid electrode is brittle and breaks easily;

the presence in the designs of a flexible gasket which connects the capacitor plate with the separator over the periphery of the banks does not rule out the possibility of the liquid electrolyte to be squeezed out of the banks beyond them, electrolyte bridges being thus formed between the adjacent banks. This leads to an increase of the leakage current and to the formation of gases owing to electrolysis of the released electrolyte, whereby the capacitor service life is shortened and its reliability is impaired.

The design of an electrochemical capacitor intended for being charged with a high voltage, comprising a large number (hundreds) of elements in a bank, must meet enhanced requirements to the mechanical strength of the capacitor body and electrical insulation between the current-leading parts, the leadout elements and the capacitor body. The capacitor design known heretofore fails to meet this requirement.

The known method of making capacitors (U.S. Pat No. 3,536,963) comprises preparing an electrode mass and making electrodes therefrom, making a separator and capacitor plates, impregnating the electrodes with an electrolyte, assembling the electrodes and capacitor plates into elements, sealing thereof, assembling with leadouts into a bank, and mounting said bank into a body.

This prior art method involves appreciable difficulties in automating the process and requires the use of costly corrosion-resistant materials for carrying out the processes of drying, proportioning the components and paste, and their transportation; the electrochemical capacitor cannot be manufactured using one production line.

The method of shaping an electrode does not ensure introducing the same amount of activated carbon particles into the electrode, therefore the capacity of the bank of elements comprised in the capacitor features an appreciable spread, this leading to an appreciable voltage redistribution in the bank when charging the block of series-connected elements. This calls for arranging an additional number of elements in the barn for lowering the mean charging voltage per element, whereby the capacitor mass and internal resistance become increased.

In addition to the above-stated reasons, the process of capacitor manufacturing in accordance with the prior-art method requires additional refinements and circumstantiation of the operations, particularly the possibility of controlling the components of capacitor units.

DISCLOSURE OF THE INVENTION

The present invention is directed to the provision of an electrochemical capacitor with such an embodiment of the electrodes, the bank of elements and capacitor body, as well as of insulation and sealing elements, which would make it possible to diminish the contact resistance values which determine the overall internal resistance of each bank of elements, and to lower the probability of electrolyte leakages from the volume of the banks of elements and the probability of electrolyte bridges being formed between the bank elements and between the banks of elements and the body; and also to the provision of a method of manufacturing an electrochemical capacitor, which would make it possible to ensure reproducibility and stability of the electrical characteristics of the capacitor, including large-size and high power capacity capacitors, and to make the manufacture thereof less labor-consuming.

The above-stated technical result is attained by the provision of an electrochemical capacitor comprising a body, at least one bank of elements and leadouts associated therewith arranged in said body, the bank of elements consisting of series-connected end and internal elements comprising porous electrodes with activated carbon particles and a bulk collector, electron-insulating separators and an electron-conducting collector, the separators being impregnated with an electrolyte, which capacitor, according to the invention is provided with interconnected hold-downs arranged in the body, with electron-conducting current taps intended for leveling-out the voltage in the series-connected elements of the bank and arranged in the openings of each of the separators, and with a coating disposed on the banks of elements, between which coating and the body an additional layer is provided, the body being made self-supporting and the porous electrodes being made elastic.

The present invention is also characterized by that each internal element of the bank consists of an electron-conducting collector, porous different-polarity electrodes disposed on its opposite sides, and electron-insulating separators mounted on the electrodes, the end elements of the bank consisting of a collector and an electrode of an appropriate polarity disposed on one of its sides.

Such an embodiment of the banks makes it possible to reduce the volume and mass, as well as the internal electrical resistance of the capacitor bank by decreasing the number of collector plates.

The invention is characterized by that the bulk collector is made from a non-carbon material and uniformly distributed in the bulk of the electrodes, and can be made in the form of chain structures based on fine-dispersed metal powders consisting of spherical or cylindrical or additionally reactivated particles.

In this case it is of important that non-carbon materials have a higher conductance than carbon materials, and their uniform distribution in the bulk of the electrodes Takes it possible to decrease the electrical resistance of the electrodes.

It is most reasonable to make the bulk collector from chain structures of reactivated fine-dispersed metal powders (Ni, Fe), consisting of spherical or cylindrical particles. Particles of such a shape are disposed more uniformly, and this simplifies the process of manufacturing a bulk collector.

Reactivation makes it possible to remove oxides and reduce the contact resistance of the particles.

The invention is characterized also by that each electron-insulating separator is made as a flexible elastic and resilient gasket, the gasket being made of nonwoven fibers deformed preliminarily to 60–80% of their initial thickness, the fibers being made of a polymer containing halogens or having hydrophilic groups grafted to its surface.

If the fibers are deformed to less than 60% of their initial thickness, carbon particles may penetrate into the pores, whereas upon deformation of the fibers to more than 80% of their initial thickness the separator porosity decreases appreciably, its electrolyte-intensity and resistance increase.

With the fibers made from the above-mentioned polymer the electrolyte-intensity of the separator can be increased considerably (to 2.5 g/g).

The ratio of the linear dimensions of the electron-insulating separator to those of the electron-conducting collector is 1:(1–1.05).

The overall dimensions of the separator being smaller than those of the collector, short-circuiting of the electrodes to the electrolyte can be obviated.

If the ratio of the ratio of their linear dimensions is less than 1:1, short-circuiting of the elements to the electrolyte is quite probable. If the ratio of their linear dimensions exceeds 1:1.05, a collector short-circuit may occur.

The invention is characterized also by that the openings made in the electron-insulating separators are shifted from the center, the openings in the separators of the opposite porous electrodes (6, 7) being shifted to the opposite sides relative to the axis of the element. This makes it possible to adjust the resistance of the electron-conducting conductor.

The flat electron-conducting conductor with which the electrochemical capacitor is provided is made from a polymeric film filled with carbon with the conductivity anisotropy along the surface and along the normal to the surface, the conductivity along the normal being greater than along the surface of the film. Almost any electrolyte-resistant film can be used as such polymeric film.

The chosen directions of the conductivity anisotropy and their relative value make it possible to adjust the resistance of the conductor.

The invention is characterized also by that the electron-conducting collector is provided over its contour with a coating comprising several layers of heterogeneous materials, one of them being a non-hardening polymeric composition, into whose formulation a solution of components is introduced, which can diffuse from the bulk of the composition to the surface thereof and to the surface of the composition-collector contact, neutralizing the film of the electrolyte and chemically binding it into an inactive compound. A concentrated aqueous solution of phosphoric acid is used as such a component.

The application of the coating over the contour of the electron-conducting collector makes it possible to preclude the possibility of short-circuiting the neighboring elements to the electrolyte. The non-hardening polymeric composition increases the capacitor dependability.

A concentrated aqueous solution of phosphoric acid, upon reaction with the electrolyte, gives an insoluble compound.

The invention is characterized by that the second layer of the coating is made from a fine-dispersed hydrophobic powder consisting of polymer particles separated from each other and embedded into the first layer.

Perfluoroethylene particles having a size of 50–400 μm are used as the component of the second layer.

The hydrophobic properties of the second layer provide air escape from the cells, while precluding the passage of the electrolyte.

With the particle size less than 50 and greater than 400 μm the retaining capacity of the electrolyte is decreased; each collector can be provided with a sealing compound coating over the collector contour from one side thereof.

The invention is characterized by that as the sealing compound a polymeric composition is usually used, comprising a solution of a component having an ability to diffuse on the surface of the composition from the bulk thereof and on the surface of the composition-collector contact, neutralizing the electrolyte film and containing a powder-like filler for imparting shape stability to the non-hardening composition; as well as by that as the component solution use is made of a concentrated aqueous solution of phosphoric acid and as the shaping powder-like filler use is made of tetrafluorethylene particles having a size of 50–400 μm in an amount of 30–80% with respect to the total weight of the composition.

In order to reduce the overall dimensions and mass of the capacitor, as well as to provide a uniform distribution of the compressive force exerted by the hold-downs on the banks, he hold-downs have a variable thickness. The maximum thickness of the hold-down is at the points of origination of maximum bending moments; the minimum thickness of the hold-down is at the points of origination of minimum bending moments, the hold-downs being preliminarily elastically strained in a direct opposite to the direction of the reactive action and provided from the side contacting the bank of elements with a resilient element made in the form of an integral complex dielectric having a layer of semi-rigid rubber which distributes uniformly the forces over the plane of the banks.

For sealing the elements, the bank is coated with a layer of non-hardening polymeric composition which may be identical to the material of the first layer of the collector coating.

The overall coating of the banks of elements has an additional layer which separates this coating from the material of the capacitor body and eliminates the effect of the neutralizing component of the coating on the rate of hardening of the polymeric composition of the capacitor body.

It should be pointed out that the additional layer is made from a mixture of low-molecular and high-molecular polyisobutylene.

The invention is characterized also by that the porous electrodes with activated carbon particles have the following solid phase-to-liquid ratios:

for the positive electrode: 1:(1.1–1.2), for the negative electrode: 1:(1.1–1.3).

If said ranges are increased, the electrolyte may leak out during the assembly of the banks of elements; if the value is lower than the prescribed minimum, the internal resistance of the capacitor increases sharply at negative temperatures.

The technological result attainable by the proposed method of manufacturing an electrochemical capacitor owing to the provision of a method o f manufacturing an electrochemical capacitor, comprising preparing an electrode mass and making electrodes from it, manufacturing separators and collectors, impregnating the electrodes and separators with an electrolyte, assembling the electrodes and collectors into elements, sealing thereof, assembling with leadouts into a bank and mounting thereof in a body, in which method, according to the invention, elastic electrodes are manufactured from an electrode mass consisting of a mixture of coal, a disperse metal and an electrolyte, by depositing onto the opposite sides of a collector, onto whose contour two different layers of a material or one form-stable layer of a sealing compound are (is) preliminarily applied from one or two sides, separators preliminarily assembled with electron conductors are placed on the surface of each of the electrodes, the electrodes with the collectors and separators are passed through a calibration nip with a layer of a filter material, and simultaneously primary impregnation of the separator is effected by transfer of excess electrolyte from the electrodes into the filter material through the separator layer, the collectors with the electrodes and separators are press-molded through a layer of filter material and simultaneously a secondary impregnation of the separators is effected by transfer of a part of the electrolyte from the outer layer of the electrodes into the filter material through the separator, while preserving excess of the electrolyte in the central part of the electrodes to ensure their elasticity; then the electrodes thus prepared are assembled into a bank of elements, the bank is fitted with end electrodes of an appropriate polarity with collectors, the bank is evacuated, fixed together with current leadouts between hold-downs, coated with a non-hardening polymeric composition neutralizing the electrolyte, coated with a layer separating the composition from the material of the capacitor body, and coated with a polymer which, while hardening, becomes a self-supporting body compressing the banks.

The invention is also characterized by that the impregnation of carbon with the electrolyte is carried out simultaneously with colloidal milling of the mixture of carbon with the electrolyte, then a metal powder is introduced into this mixture, and the milling is completed.

This provides a more effective impregnation of activated carbon and a uniform distribution of the metal powder in the mixture.

The application of the electrode mass to the opposite surfaces of the collector carried out by the method of precision pasting through a silk screen, followed by leveling-out in opposite directions, makes it possible to obtain precise dimensions and proportioning of the electrodes.

The method of manufacturing an electrochemical capacitor is characterized by that prior to precision pasting the electrode mass is depleted of the electrolyte by the method of static decantation and/or centrifugation to remove excess electrolyte from the mixture.

To preclude forcing over of the end elements of the bank by the hold-downs having a bend toward the bank when fixing the banks between the hold-downs for a prescribed pressure, the hold-downs are preliminarily straightened by means of technological force members disposed on the compression frames of technological screw clamps and removed after the hold-downs are connected with each other.

The invention is characterized by that the bank of elements prior to mounting between the hold-downs is evacuated at a residual pressure of 9.8–19.6 kPa, and for the bank assembled from elements whose collectors have a one-sided contour coating evacuation is carried out at a residual pressure of 9.8–19.6 kPa; then in general cases, press-molding with a pressure of 0.5–1.6 mPa till the contour coatings of the neighboring collectors come in contact with each other, sealing of the bank being carried out at the same residual pressure.

This makes it possible to remove excess air dissolved in the electrolyte during the colloidal milling of the electrode mass.

BRIEF DESCRIPTION OF DRAWINGS

The essence of the proposed invention will become more apparent from a subsequent description of the capacitor design and the method of its manufacture, to be read on conjunction with the accompanying drawings, in which:

FIG. 2 shows a sectional view of the structure of an internal element;

FIG. 3 shows an embodiment of an internal element with a sealing compound applied to one side thereof;

FIG. 4 shows the structure of a hold-down.

PREFERRED EMBODIMENT OF THE INVENTION

Figure 1:
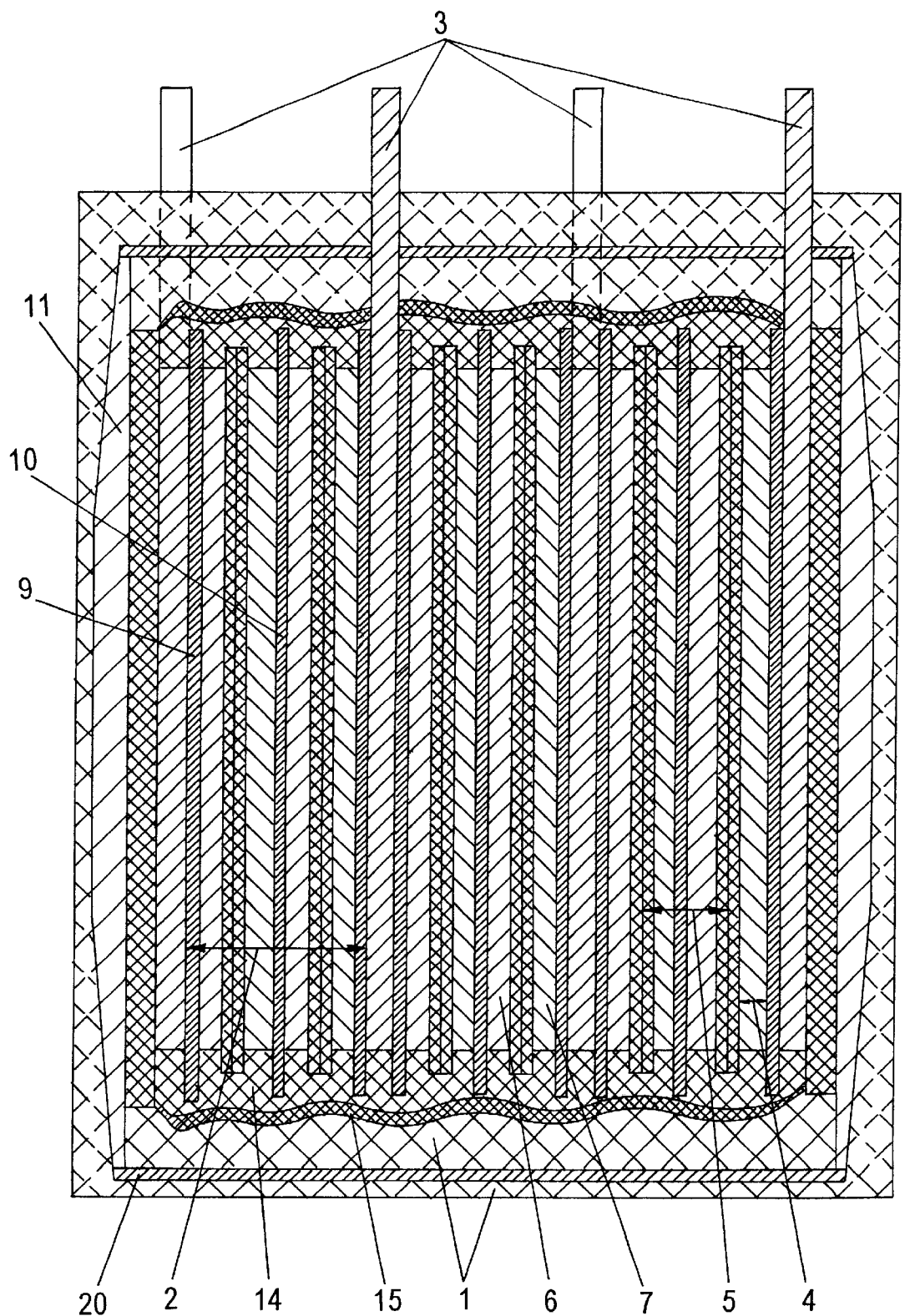
FIG. 1 shows diagrammatically a longitudinal section of the electrochemical capacitor according to the invention.

An electrochemical capacitor comprises a body 1 in which at least one bank of elements 2 is arranged. Leadouts 3 are connected to the bank (or banks).

The bank of elements 2 consists of series-connected end elements 4 and internal elements 5, comprising porous electrodes 6 and 7 with activated carbon particles and a bulk collector (not shown) which comprises fine-dispersed particles of a non-carbon material (for instance, of carbonyl nickel), distributed uniformly in the bulk of the electrode (6 and 7).

Electron-insulating separators 8 and 9 are arranged on the electrodes 6 and 7, and an electron-conducting collector is disposed between the electrodes. The separators and electrodes are impregnated with an electrolyte.

The body 1 of the capacitor accommodates hold-downs 11 (interconnected, e.g. with the help of ties 20) with a resilient element 16, and also electron-conducting conductors 12 in ended for leveling-out the voltage in the series-connected elements of the bank 2. The conductors 12 are disposed in openings 13 made in the separators 8 and 9.

The bank of elements (or each bank of elements) 2 has a coating 14 between which and the body 1 an additional layer 15 is provided.

The structure of the body 1 of the capacitor is self-supporting. Porous electrodes 6 and 7 are elastic, this providing for their low cost and quality manufacture on conventional equipment.

Each internal element of the bank 2 consists of electron-conducting collector 10, opposite-polarity porous electrodes 6 and 7 disposed on its opposite sides, and electron-insulating separators 8 and 9 mounted on the electrodes.

The electrochemical capacitor is manufactured in the following manner. First, electrodes 6 and 7, separators 8 and 9 and collectors 10 are manufactured from an electrode mass. Then the electrodes 6 and 7 and the separators 8 and 9 are impregnated with an electrolyte, the electrodes and collector are assembled into an element, and the latter is sealed.

After that the elements with leadouts are assembled into a bank and the bank is installed in the body 1.

The electrodes 6 and 7 are manufactured from an electrode mass consisting of a mixture of activated carbon, a bulk collector made from a non-carbon material, and an electrolyte (without adding a binding component). The prepared mass is applied to the opposite sides of the collector 10 onto whose contour preliminarily from one or two sides (depending on the service conditions of the capacitor) two layers of a material 17 and 18 or one layer of a sealing compound 19 are applied.

The electrode mass is applied to the collector 10 by precision pasting through a silk screen, followed by leveling-out the mass, e.g., with the help of a doctor by moving the latter several times in opposite directions.

For carrying out an effective precision pasting, the electrode mass is depleted of the electrolyte, the depletion of the mass being effected by static decantation or centrifugation, or by performing both operations alternately.

Then the separators preliminarily assembled with the electron-conducting conductors are placed on the surface of each electrode, whereafter the electrodes with the collectors and the separators are rolled between rollers to which a layer of filter material is applied, and simultaneously a primary impregnation of the separator with the electrolyte is perform. This impregnation is effected by transfer of excess electrolyte to the filter material through the layer of the separator 8 or 9.

After that the collector with the electrodes and the separators are press-molded through a layer of the filter material and simultaneously a secondary impregnation of the separator is effected by transfer of a part of the electrolyte from the outer layer into the filter material through the separator.

It is of great importance that a part of the electrodes retains a certain excess of the electrolyte, whereby elasticity is imparted to the electrode.

Then the elements (electrodes, collectors and separators) are assembled into a bank of elements, the bank is fitted with end electrodes of appropriate polarity with the collectors 10, and the bank is evacuated together with the leadouts 3. The bank is fixed between the hold-downs 11 and coated with a component which neutralizes the electrolyte.

The assembled device is coated with a material which separates the component from the polymer, which, while hardening, makes up a self-supporting body compressing the banks of elements.

To preclude forcing over of the end elements of the bank by the hold-downs 11 having a bend toward the banks when fixing the banks between the hold-downs 11 for a prescribed pressure, the hold-downs are straightened by means of technological force members disposed on the compression frames of technological screw clamps (not shown) which are removed after the hold-downs are connected with each other, e.g., by such elements as ties 20.

The bank of elements is evacuated during 10 minutes at a residual pressure of 9.8–19.6 kPa.

If the evacuation is carried out during a period of time less than 10 minutes, the excess air dissolved in the electrolyte in the course of colloidal milling of the electrode mass is removed not completely.

A residual pressure smaller than 9.8 kPa does not provide for effective displacement of excess air from the bank of elements, while operation at a pressure higher than 19.6 kPa may lead to evaporation of the electrolyte.

It is also necessary to point out that the impregnation of activated carbon with the electrolyte is carried out simultaneously with colloidal milling of the mixture of carbon with the electrolyte, then a metal powder is introduced into this mixture, and the milling is completed. To remove the air dissolved in the electrolyte during colloidal milling of the electrode mass and to preclude air penetration deep into the bank of elements whose collectors have a one-sided contour coating, the bank is evacuated at a residual pressure of 9.8–19.6 kPa and then press-molded with a pressure of 0.5–1.6 mPa till the contour coatings of the neighboring collectors come in contact with each other. Sealing of the bank is carried out at the same residual pressure.

Press-molding with a pressure less than 0.5 mPa brings about a large internal resistance, whereas a pressure greater than 1.6 mPa brings about a danger of electrolyte escape and capacitor degradation.

INDUSTRIAL APPLICABILITY

Using the proposed method, a capacitor was manufactured, comprising one bank of elements which has sixteen internal and two end elements. The rated voltage of the capacitor is 15 V, its capacity is 15 F, and its internal resistance is 17 mΩ. The overall dimensions of the electrodes are 148–128 mm, the overall dimensions of the elements are 160×140 mm.

This capacitor can be discharged with currents to 800 A.

After testing the capacitor for the effect of an elevated ambient temperature of +70° C. at a constantly applied voltage during 1000 hours its characteristics remained unchanged, and the spread of voltages in the elements was from 0.75 to 0.95 V.

The range of possible applications of the capacitor is very broad: from weak-current electronic engineering to heavy-current stationary and mobile electrical systems.

These devices are efficient both as capacitors proper and as energy storage units.

As capacitors having a smaller weight and overall dimensions than capacitors of other types, they can be used in ripple filters of DC sources, in powerful integrating and differentiating circuits as elements with a low reactive and active resistance at low-frequency currents, in protection systems, for powering pulsed magnets.

Capacitors with a low internal resistance can be used as independent current sources instead of other sources, as well as in conjunction with other DC sources.

Tractive and starting capacitors have been developed.

Tractive capacitors can be used with electric trolleys, electrorobocars, loaders, invalid's wheel chairs, trolleys in hospitals, airports and the like, for recuperation of the braking energy of transport facilities. Starting capacitors are used for motoring the starters of internal combustion engines of passenger cars and cargo trucks, tractors, and other vehicles under severe conditions (frosts down to −50° C., thickening of lubricants).

What is claimed is:

1. An electrochemical capacitor comprising a body (1), at least one bank of elements (2) installed therein and leadouts (3) connected thereto;

said at least one bank of elements consisting of series connected end elements (4), and internal elements (5);

said internal elements (5) comprising: porous electrodes (6, 7) formed of activated carbon particles, a bulk collector, electronic insulating separators (8, 9), and an electron-conducting collector (10);

said separators and electrodes are impregnated with an electrolyte;

the electrochemical capacitor further comprising hold downs (11) which are interconnected and mounted in the capacitor body, electron-conducting conductors (12) intended for leveling-out voltage in the series-connected elements of the at least one bank; and a coating (14) disposed on the at least one bank of elements (2); said electron-conducting conductors are arranged in openings (13) of each of the separators (8,9);

an additional layer (15) being provided between the coating (14) and the body (1);

said body is self-supporting and the porous electrodes (6, 7) are elastic.

2. An electrochemical capacitor according to claim 1, characterized in that each internal element (5) of the at least one bank (2) consists of the electron-conducting collector (10), the porous electrodes (6, 7)

having different polarity disposed on the opposite sides of the electron-conducting collector, and the electron insulating separators (8,9) installed on the electrodes;

the end elements (4) of the at least one bank consisting of a collector (10) and an electrode (6 or 7) of an appropriate polarity on one side of the collector (10), and a separator.

3. An electrochemical capacitor according to claim 1, characterized in that the bulk collector is made from a non-carbon material and is distributed uniformly in the bulk of the electrodes.

4. An electrochemical capacitor according to claim 1, characterized in that the collector is made from chain structures based on fine-dispersed metal powders selected from the group consisting of spherical, cylindrical, and reactivated particles.

5. An electrochemical capacitor according to claim 1, characterized in that each electron-insulating separator (8, 9) is made as a flexible, elastic and resilient gasket.

6. An electrochemical capacitor according to claim 5, characterized in that the gasket is made from nonwoven fibers preliminarily deformed to 60–80% of their initial thickness.

7. An electrochemical capacitor according to claim 6, characterized in that the fibers are made from a polymer containing halogens or having hydrophilic groups grafted to its surface.

8. An electrochemical capacitor according to claim 1, characterized in that the overall dimensions of the electron-insulating separator (8, 9) are smaller than the overall dimensions of the collector (10).

9. An electrochemical capacitor according to claim 1, characterized in that the ratio of the linear dimensions of the electron-insulating separator to the linear dimensions of the electron-conducting collector is 1:(1–1.05).

10. An electrochemical capacitor according to claim 1, characterized in that the openings made in the electron-insulating separators (8, 9) are shifted from the center thereof, the openings (13) in the separators of the opposite porous electrodes (6, 7) being shifted to the opposite sides relative to the axis of the element.

11. An electrochemical capacitor according to claim 1, characterized in that the electron-conducting conductors (12) are made from polymeric film filled with carbon with conductivity anisotropy along the surface and along the normal to the surface, the conductivity along the normal being greater than along the surface of the film.

12. An electrochemical capacitor according to claim 1, characterized in that the electron-conducting collector (10) is provided with a coating over the entire contour thereof, comprising several layers of heterogeneous materials.

13. An electrochemical capacitor according to claim 12, characterized in that a first layer of the coating layers of the collector (10) is made of a non-hardening polymeric composition into whose formulation a solution of a component is introduced, which can diffuse from the bulk of the composition to the surface thereof and to the surface of the composition-collector contact.

14. An electrochemical capacitor according to claim 13, characterized in that a concentrated aqueous solution of phosphoric acid is used as the solution of the component neutralizing the electrolyte.

15. An electrochemical capacitor according to claim 13, characterized in that a second layer of the coating layers is made of a fine-dispersed hyrophobic powder consisting of polymer particles separated from each other and embedded into the first layer of the coating layers.

16. An electrochemical capacitor according to claim 15, characterized in that perfluoroethylene particles having a size of 50–400 micrometers are used as said second layer.

17. An electrochemical capacitor according to claim 13, characterized in that each collector (10) has a contour coating with a sealing compound, applied to one side thereof.

18. An electrochemical capacitor according to claim 17, characterized in that as the sealing compound a polymeric composition is used, comprising a solution of a component having an ability to diffuse on the surface of the composition from the bulk thereof and on the surface of the composition-collector contact, neutralizing the electrolyte film and containing a powder-like filler for imparting shape stability to the non-hardening composition.

19. An electrochemical capacitor according to claim 18, characterized in that as the component solution use is made of a concentrated aqueous solution of phosphoric acid and as the shaping powder-like filler use is made of tetrafluorethylene particles having a size of 50–400 $\mu$m in an amount of 30–80% with respect to the total weight of the composition.

20. An electrochemical capacitor according to claim 1, characterized in that the hold-downs (11) have a variable thickness and are preliminarily elastically strained.

21. An electrochemical capacitor according to claim 1, characterized in that the hold-downs (11) are provided with a resilient element (16) from the side contacting with the at least one bank of elements.

22. An electrochemical capacitor according to claim 1, characterized in that the resilient element (16) is made in the form of an integral complex dielectric provided with a layer of semi-rigid rubber.

23. An electrochemical capacitor according to claim 1, characterized in that the coating (14) of the at least one bank of elements (2) is made from a non-hardening polymeric composition.

24. An electrochemical capacitor according to claim 13, characterized in that the materials of the coating (14) of the at least one bank of elements and of the first layer of the coating layers of the collector are the same.

25. An electrochemical capacitor according to claim 1, characterized in that the additional layer (15) is made from a mixture of low-molecular and high-molecular polyisobutylene.

26. An electrochemical capacitor according to claim 1, characterized in that the porous electrodes (6, 7) with active carbon particles, impregnated with the electrolyte having the following solid phase-to-liquid ratios:

for the positive electrode: 1:(1.1–1.2),
for the negative electrode: 1:(1.1–1.3).

* * * * *